United States Patent [19]
Ishikawa et al.

[11] Patent Number: 4,876,605
[45] Date of Patent: Oct. 24, 1989

[54] IMAGE READING DEVICE

[75] Inventors: Osamu Ishikawa; Kiyoshi Sumiya, both of Tokyo, Japan

[73] Assignee: Oki Electric Industry Co., Ltd., Tokyo, Japan

[21] Appl. No.: 140,509

[22] Filed: Dec. 31, 1987

[30] Foreign Application Priority Data

Jan. 12, 1987 [JP] Japan ................................ 62-003337
Dec. 16, 1987 [JP] Japan ................................ 62-319327

[51] Int. Cl.⁴ .......................... H04N 1/40; H04N 1/00
[52] U.S. Cl. .................................... 358/400; 358/443; 358/464; 382/53
[58] Field of Search ............... 358/260, 282, 256, 294, 358/280; 250/205; 340/641; 382/53

[56] References Cited

U.S. PATENT DOCUMENTS

| 4,325,086 | 4/1982 | Sato | 358/285 |
|---|---|---|---|
| 4,446,486 | 5/1984 | Itoh | 358/282 |
| 4,481,666 | 11/1984 | Niwa | 382/53 |
| 4,482,922 | 11/1984 | Amemiya | 358/282 |
| 4,516,174 | 5/1985 | Kammoto | 358/282 |
| 4,562,486 | 12/1985 | Suzuki | 382/53 |
| 4,658,303 | 4/1987 | Nagano | 358/294 |
| 4,672,682 | 6/1987 | Naruse . | |
| 4,680,624 | 7/1987 | Murakami | 358/36 |
| 4,687,919 | 8/1987 | Nagano | 250/205 |
| 4,709,274 | 11/1987 | Tanioka | 382/53 |
| 4,763,200 | 8/1988 | Nakatani | 358/282 |

FOREIGN PATENT DOCUMENTS 0275143 7/1988 European Pat. Off. .

OTHER PUBLICATIONS

Variable Intensity Illumination Scanner Calibration System; Dattilo; Nielson; IBM Tech. Disc. Bull., vol. 21, No. 9, Feb. 1979.

Primary Examiner—Edward L. Coles, Sr.
Assistant Examiner—Jerome Grant, II
Attorney, Agent, or Firm—Spencer & Frank

[57] ABSTRACT

An image reading device comprising a light source for illuminating a medium to be read and a line sensor including a line of photoelectric conversion elements for receiving light from the medium and producing an image signal. White levels are determined for respective intervals into which the line of photoelectric conversion elements are divided. The device sets threshold levels for the respective intervals on the basis of the white levels for the respective intervals, and the image signal is compared with the set threshold levels to produce a series of binary signals. The condition of the light source being "off" not lit is determined on the basis of the relative magnitude between the white levels for the intervals.

3 Claims, 10 Drawing Sheets

IMAGE READING DEVICE

BACKGROUND OF THE INVENTION

This invention concerns an image reading device used in electronic print boards, facsimile machines or the like, in particular a device capable of detecting that a light source for illuminating a source document is off.

Figure 1:
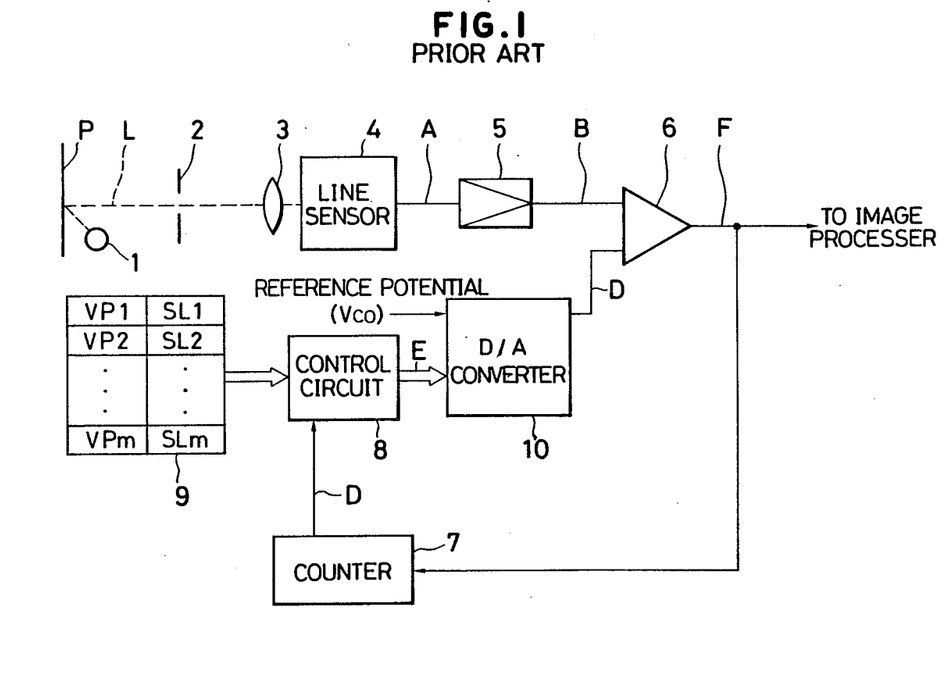
FIG. 1 is a block diagram showing an example of a prior art device.

A conventional image reader of this type is shown in block diagram of FIG. 1. In this figure, 1 represents a lamp for lighting a source document P, 2 represents a shading plate smooths the light intensity distribution of a reflected light L from the source document P, 3 is an image formation lens, and 4 is a line sensor which includes a line of photoelectric conversion elements for producing an image signal A. 5 is an amplifier for amplifying the image signal read by line sensor 4 to produce an amplified image signal B, 6 is a comparator which compares the amplified image signal B with a slice level D to produce a series of binary pixel signals, 7 is a counter for counting the binary signals of a value "1", 8 is a control circuit, 9 is a memory, and 10 is a D/A converter.

In the above configuration, the image signal A produced by line sensor 4 is amplified by amplifier 5, becoming the amplified image signal B, and is input into comparator 6. Image signal B is then converted to binary signals F by way of a comparison with slice level D produced by D/A converter 10.

Figure 2A:
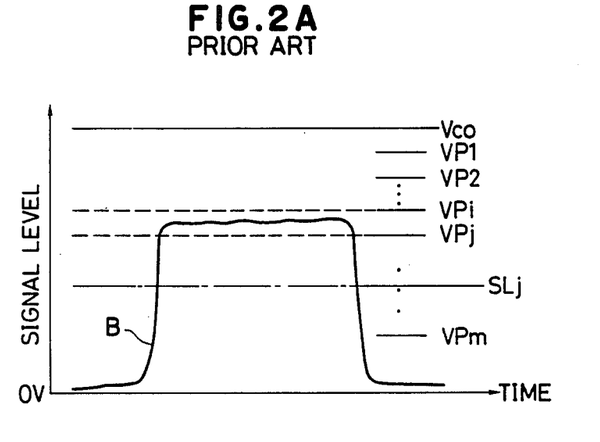
FIG. 2A and 2B are graphs showing the relationship between slice levels for finding the peak value and an image signal generated from the prior art device of FIG. 1.
Figure 2B:
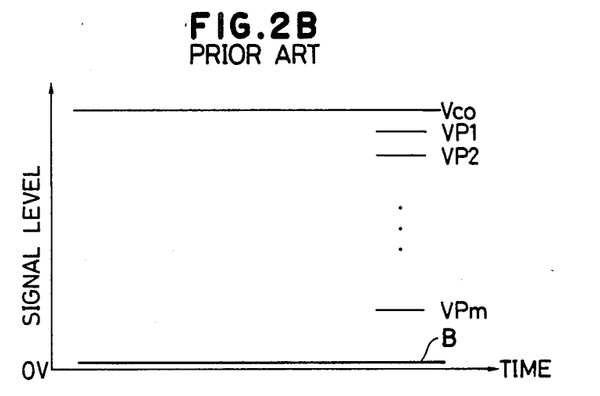

Prior to the start of actual image reading, the peak valve of one line of the image signal is determined and a threshold level to be used in the subsequent actual image reading is obtained from the peak valve thus determined. This is done in the following manner. For purposes of the following description, "actual image reading" means the process of reading data from an area of source document on which images (characters, symbols, pictures etc. to be processed) have been written. The "threshold level" means the slice level D used during actual image reading. FIGS. 2A and 2B are graphs showing the relationship between the slice levels and the image signals. As shown in FIG. 2A, as a first step, control circuit 8 calls for the maximum value of the slice level information (these slice levels are used for finding the peak valve of the image signal) stored earlier in memory 9; then control circuit 8 inputs into comparator 6 the slice level information E, which is converted at D/A covverter 10, together with the reference voltage Vco, into an analog signal D of a value of slice level VP1 stored in memory 9 and under this condition, line sensor 4 reads one line of the image, and image signal B is input into comparator 6. The image signal B is compared with slice level VP1, and is output as binary signals F consisting of "1" and "0" bits. Binary signals F of a value "1" are counted by counter 7; the result of the counting, G, is then input into control circuit 8. When the count value G at the end of reading of each line is less than a certain value, control circuit 8 calls from memory 9 slice level information, e.g., VP2, which is one step lower than the previously called slice level information, e.g., VP1. In this way, the control circuit repeats the same operation, gradually decreasing the slice level information until the count value G becomes equal to or greater than the defined value. Suppose, for example, that the slice level VPj is the largest slice value which gives the count value G of not less than the defined value. Then the slice level VPj is recognized as the peak level and control circuit 8 raises a carry flag, calls from memory 9 the threshold level SLj information corresponding to peak level VPj, sets SLj as threshold level D, and then performs actual image reading.

In such a configuration, when lamp 1 is not lit or off the carry flag will not be raised by control circuit 8 even if the slice level is lowered to VPm, the minimum slice level obtainable from the slice level information stored in memory 9. When this happens, the conventional system would conclude that lamp 1 is not lit.

Figure 3:
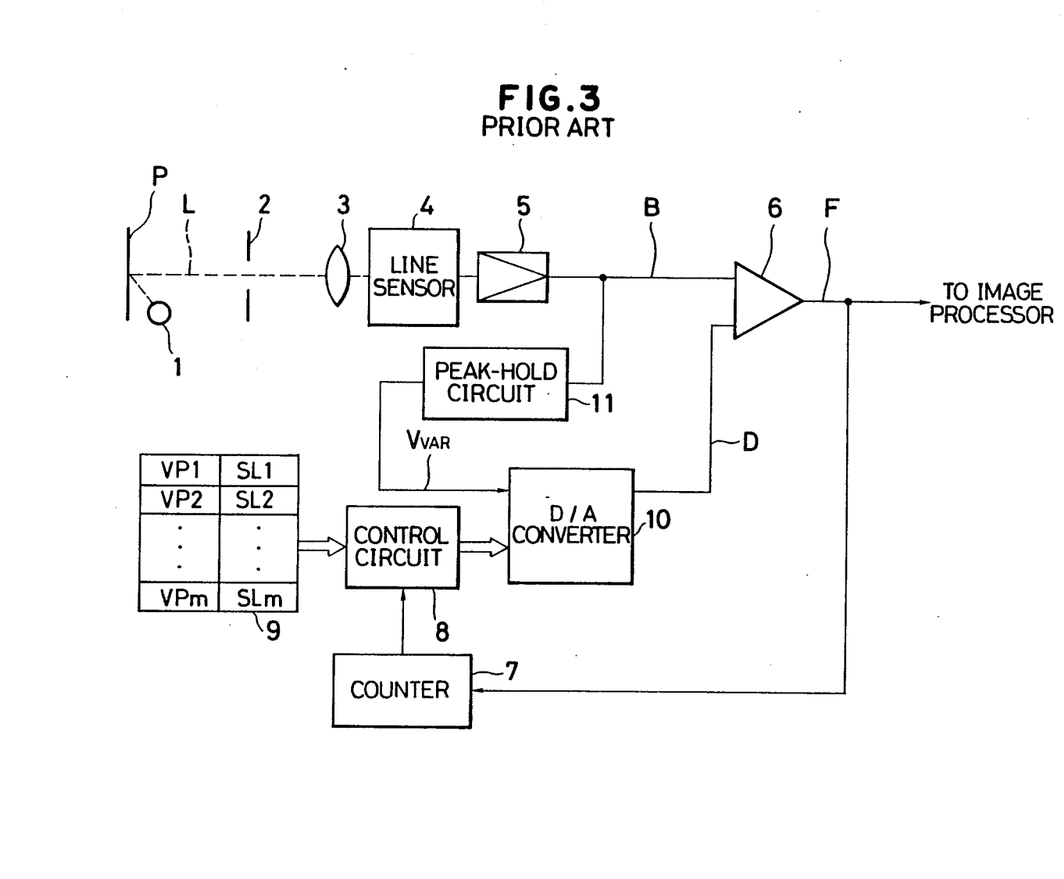
FIG. 3 is a block diagram showing another example of a prior art device.

Another example of a conventional system is the configuration shown in the block diagram of FIG. 3. The system in this example differs from that in FIG. 1 in that it has peak-hold circuit 11 for holding the peak value produced by amplifier 5, and that it varies reference voltage $V_{VAR}$ input into D/A converter 10 according to the output from peak-hold circuit 11. This enables the system to lower the threshold level when the light emission intensity from lamp 1 diminishes due to aging changes or ambient temperature changes. This also enables the system to set threshold level D consistent with the level of image signal B to enhance the fidelity with which source document P is read.

The above conventional systems have the following problems. The conventional system of FIG. 1 is capable of detecting the condition of lamp 1 not lit. However, if the light emission intensity of lamp 1 changes due to the aging or a decrease in the ambient temperature, since threshold level D remains at a fixed level, threshold level D will become inappropriate, resulting in decreased fidelity of image reading relative to the source document image.

Figure 4A:
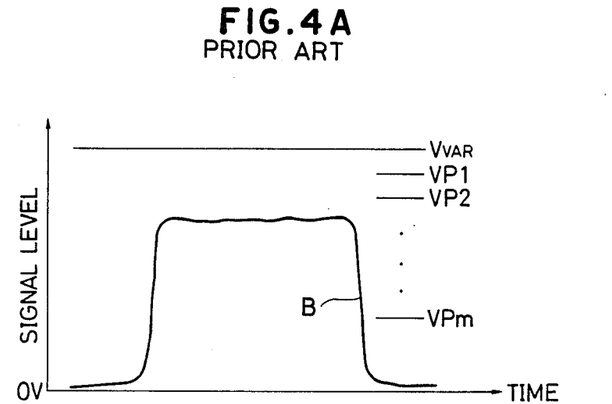
FIG. 4A, 4B and 4C are graphs showing the relationship between reference potentials and an image signal generated from the prior art device of FIG. 3.
Figure 4B:
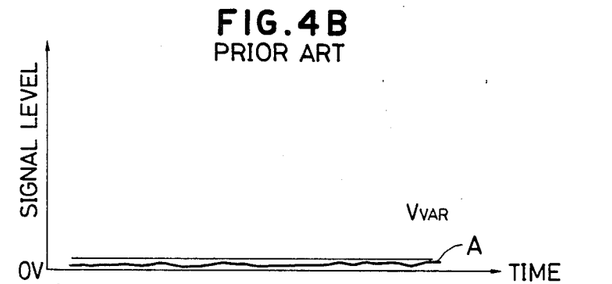
Figure 4C:
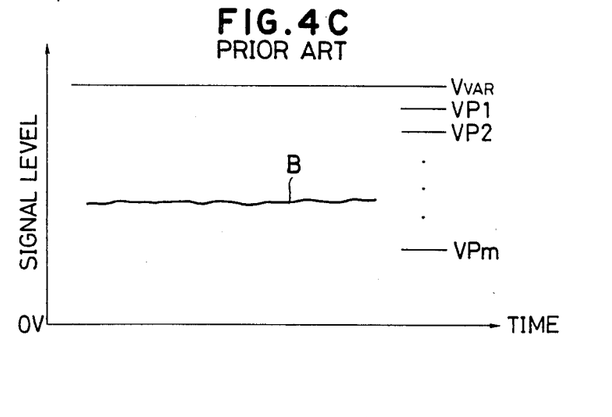

Also, even though it was possible for the conventional system of FIG. 3 to set a threshold level by taking into account the light emission intensity from lamp 1 to ensure good fidelity reading of images even in the event of a change in light intensity from lamp 1, when lamp 1 is not lit, reference voltage $V_{VAR}$ will decrease from the condition shown in FIG. 4A to that shown in FIG. 4B. When this happens, the level of image signal B (corresponding to the dark electric potential level) becomes larger than the lowest slice level VPm, as shown in FIG. 4C which is an enlargement of FIG. 4B in the direction of the signal level. Under this condition, the conventional system of FIG. 3 would fail to detect that lamp 1 is not lit.

SUMMARY OF THE INVENTION

An object of this invention is to provide an image reading device capable of high-fidelity reading of source document images as well as capable of detecting the not lit or off condition of a light source.

An image reading device for this invention comprises a light source for illuminating a medium to be read, a line sensor including a line of photoelectric conversion elements for receiving light from the medium and producing an image signal, means for determining white levels for respective intervals into which said line of photoelectric conversion element are divided, means setting threshold levels for the respective intervals on the basis of said white levels for the respective intervals, means comparing the image signal with said threshold levels to produce a series of binary signals, and means for detecting the condition of the light source not lit on the basis of relative magnitude between the white levels for the intervals.

In a preferred embodiment, such detection is made on the basis of the difference between the maximum and minimum values of the white levels for the intervals.

In another preferred embodiment, the detection is made on the basis of the white levels for the intervals that are adjacent to each other and located in a predefined region.

Figure 5:
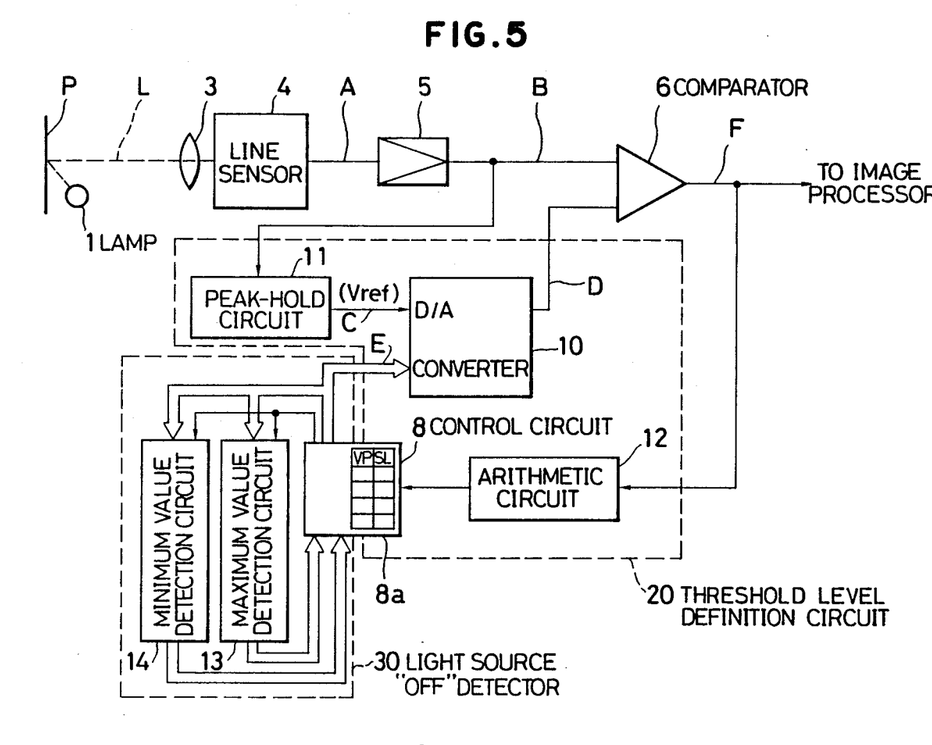
FIG. 5 is a block diagram showing an embodiment of the invention.

DETAILED DESCRIPTION OF THE EMBODIMENTS with reference to FIG. 5.

This embodiment is an image reader used in an electronic print board. As is customary, the electronic print board of this embodiment uses a fluorecent lamp 1 as shown in FIG. 1 to illuminate a source document (the medium to be read) which in this embodiment is a movable screen P on which characters, symbols and pictures are written. The light reflected from the movable screen P is focused by an image forming lens 3 on a line image sensor 4 such as a linear CCD (charge-coupled device) having a line of multiple, e.g., 1280 photoelectric conversion elements by which the optical input is converted into an electric signal called a video or image signal A. The image signal A is compared with a slice level D to produce a series of binary pixel signals F. The binary pixel signals F indicate the black or white of respective pixels during an actual image reading.

The line sensor comprises 1280 photoelectric conversion elements. This means that the entire height (the dimension in the direction parallel to the line) of the screen P consists in effect of 1280 pixels. The entire line is evenly divided into n, e.g., 10 sections or intervals and each section consists of 128 pixels.

As will be described in further details later, the highest of the pixel signals (samples of an image signal corresponding to the respective pixels) within each interval is regraded as the white level for that interval and the threshold level for that interval is determined based on this white level. Here the term "highest" means "m-th highest" where m is a natural number.

In the example under consideration, m=10, i.e., the tenth highest value of the pixel signals in each interval is found to be the white level of the interval. The white level is represented as a digital value of 7 bits, i.e., of 128 steps.

The line sensor 4 receives reflected light from a screen (recording medium) P on which letters, symbols and/or pictures are written, and converts the light into an electric signal to produce an image signal A by scanning.

An amplifier 5 amplifies the image signal A to produce an amplified image signal B, which is input to a peak-hold circuit 11 and a comparator 6.

Peak-hold circuit 11 holds the peak value of the input that has been applied to it, and its output C is input to a reference voltage terminal Vref of a D/A (digital-to-analog) converter 10 to be used as the reference voltage. Supplied to the input data terminal of D/A converter 10 is digital data E from a control circuit 8.

Control circuit 8 has a memory 8a which, similar to memory 9 shown in FIG. 1, stores a table providing correspondence between the white levels and the threshold levels. Control circuit 8 calls from the correspondence table the threshold level information corresponding to the white level and transfers threshold level information E to D/A converter 10.

D/A converter 10 converts the digital slice level or threshold level information E into an analog slice level signal D using the output (peak value) from the peak-hold circuit 11 as the reference voltage Vref.

The output D of D/A converter 10 is supplied to the comparator 6 as a threshold level D to be used during the process of the actual image reading. The output D from the D/A converter is also used as a slice level during the process of determining the white level.

During the process of determining the white level, comparator 6 compares the image signal B with the slice level D to convert the image signal into a series of binary (pixel) signals F of "1" or "0" depending on whether or not the image signal B is larger than the slice level D.

The binary signals F are input to arithmetic circuit 12 having functions of multiple (e.g., 10) counters, which are sequentially enabled by the control circuit 8. The counters are alloted to the respective intervals or sections, and each counter is enabled when the pixel signals of the corresponding interval are processed. The control circuit 8, in cooperation with each counter, serves to determine a white level for each interval as defined by the tenth highest value of the pixel signals within the corresponding interval. This is done by the binary search method. More particularly, the slice level for each interval is initially set at the middle, i.e., 128/2. Each counter counts the number of "1" pixels in each interval by being enabled while the binary signals of that interval are produced. When the number of the value "1" pixels thus counted is larger than a predetermined value, 10 (because the tenth highest value of the pixel signals is being sought), then the slice level is increased by $128/2^2$: if not, it is decreased by $128/2^2$. This process is repeated six times. The amount by which the slice level is increased or decreased is halved each time the process is repeated, so that at the sixth process, the amount by which the slice level is inceased or decreased is $128/2^{6+1}=1$. The optimum slice level is thus determined while six lines are scanned. This slice level remaining in the counter at the end of the binary search is detected and stored in the control circuit 8, and gives the tenth highest value of the pixel signals and is used as the white level. The reason that the first highest value of the pixel signals is not used as the white level is that there can be noise associated with the pixel signals which gives rise to an especially bright spot which should be ignored.

The control circuit 8 multiplies the white level with a coefficient, typically having a value between 0.65 and 0.75, e.g., 0.7 to produce a threshold level that should be used during processing of effective data, i.e., data from the area of which the image is to be read and processed. This multiplication is implemented by use of the memory 8a in the form of a table.

During processing of the actual image data, the control circuit 8 sequentially selects the threshold level corresponding to the interval of which the pixel signals are being processed. As a result of the comparison made at the comparator 6 using the threshold level D thus provided, a signal "1" at the output of the comparator 6 signifies white (or bright) and a signal "0" signifies black (or dark).

Of the components described above, the peak-hold circuit 11, the D/A converter 10, the arithmetic circuit 12 and the control circuit 8 in combination form a threshold level definition circuit 20 which sets the threshold levels to be input into comparator 6 for the actual image reading.

The image reader of this embodiment is further provided with a maximum value detection circuit 13 which detects the maximum value of the white levels of all the intervals and a minimum value detection circuit 14 which detects the mimimum value of the white levels of all the intervals. The maximum value detection circuit 13 and the minimum value detection circuit 14 in combination with the control circuit 8 form a light source "off" detector circuit 30 for lamp 1.

In this embodiment, lamp "off" detector circuit 30 determines that lamp 1 is not lit by the following process. During the setting of threshold level D described above, the white level information is supplied to maximum value detection circuit 13 and minimum value detection circuit 14. When the determination of the white levels is completed, the maximum and the minimum values of the white levels are left in the maximum value detection circuit 13 and the minimum value detection circuit 14, and control circuit 8 determines that lamp 1 is not lit if the difference between the maximum values of the white levels detected by the maximum value detection circuit 13 and the minimum value of the white levels detected by the minimum value detection circuit 14 is less than the specified value.

With reference to FIGS. 6A to 6C and 7, the following describes how the embodiment of the configuration shown in FIG. 5 operates before the start of an actual reading.

Figure 7:
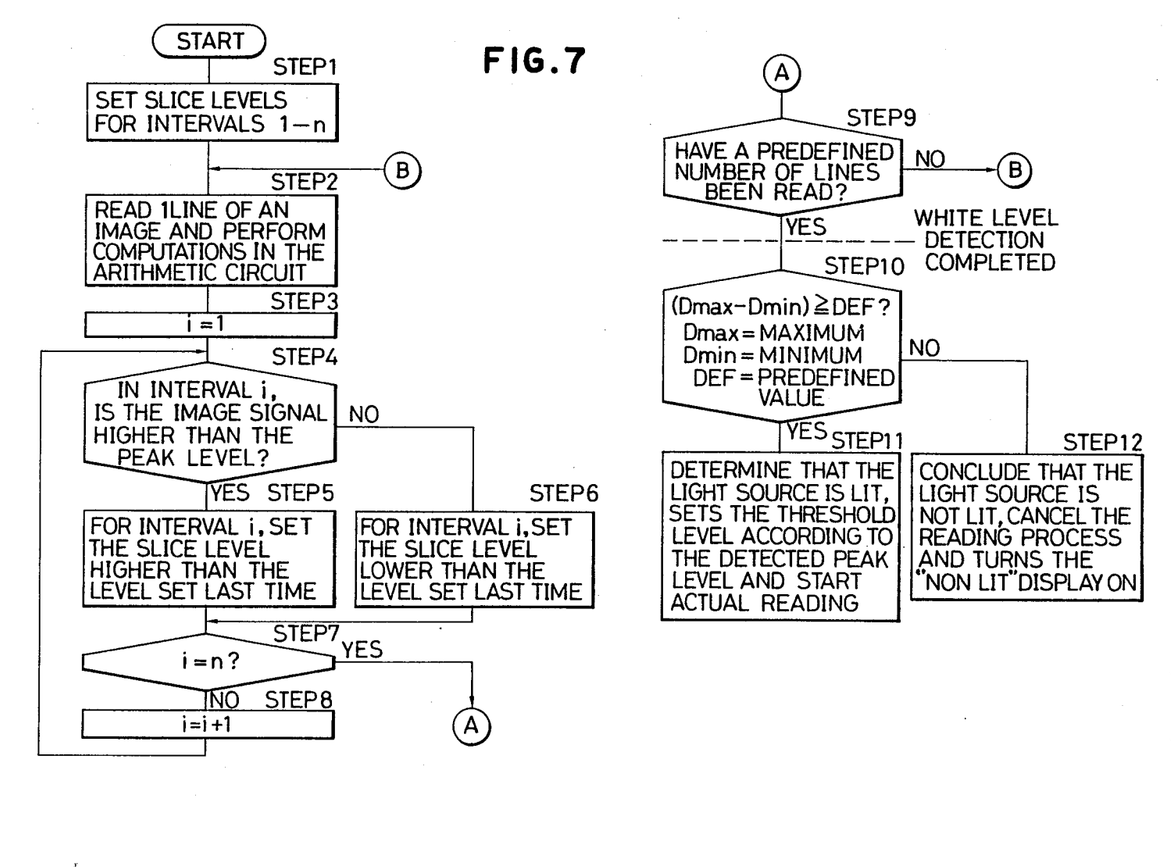
FIG. 7 is a flowchart showing the operation of the embodiment of FIG. 5.

Referring to FIG. 7 in step 1, a slice level S is set for the purpose of determining the white levels for intervals 1 to n into which the photoelectric conversion elements of line sensor 4 are divided. This slice level is identical for all the intervals and is at the middle of the full range (e.g., 128/2). Step 2 reads one line of an image, and outputs binary signals F by determining whether a given image signal is "1" or "0", based on slice level D set at the middle value. Then, arithmetic circuit 12 counts for the intervals 1 to n, the number of value "1" bits present. Step 3 sets i=1. Step 4 determines for each interval i whether slice level S lies above or below the white level of the image signal B. If it is determined that the white level of image signal B is higher than slice level S, control is transferred to step 5, where, in accordance with the binary search method described above, a new slice level S, higher by $128/2^{x+1}$ (x=1, 2, ... n), is set. On the other hand, if it is determined that the white level of image signal B is lower than slice level S, control is transferred to step 6, where, in like manner, a new slice level D, lower by $128/2^{x+1}$, is set. When the setting by either step 5 or 6 is completed, control is transferred to step 7, where a determination whether or not i=n is made. If i=n, the control is transferred to step 8, where the increment operation i=i+1 is carried out. After that, the control returns to step 4, and similar operations are repeated n times.

Figure 6A:
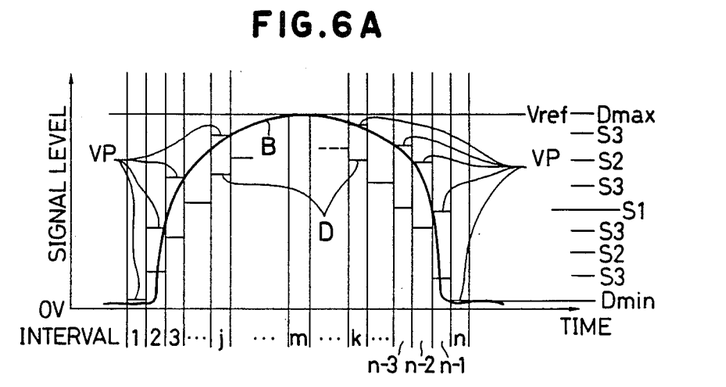
FIGS. 6A, 6B and 6C are graphs showing the relationship between reference potentials, an image signal and threshold levels.

If step 7 finds i=n, control is transferred to step 9, where a determination is made as to whether or not a predefined number (x=7 in the example under consideration) of lines have been read. If the answer is negative, the control returns to step 2, and the operations described in steps 2 through 8 above are performed on intervals 1 to n,. When a predefined number x of lines have been read, the white level setting operation terminates, resulting in white levels VP, which differ from interval to interval 1 to n, as shown in FIG. 6A.

Next, the control is transferred to step 10, where determination a is made as to whether the maximum value Dmax and the minimum value Dmin of the defined white levels set for intervals 1 to n are at least equal to DEF. When lamp 1 is lit, as shown in FIG. 6A, the output value Dmax from maximum value detection circuit 13 occurs near the center where the light intensity is high, and the output value Dmin from minimum value detection circuit 14 occurs toward the edges where the light intensity is low.

Consequently, by defining an appropriate value in DEF, by taking into consideration conditions that prevail when the lamp is not lit and conditions that prevail when the lamp is lit, a determination of Dmas−Dmin≧ DEF will be valid.

Figure 6B:
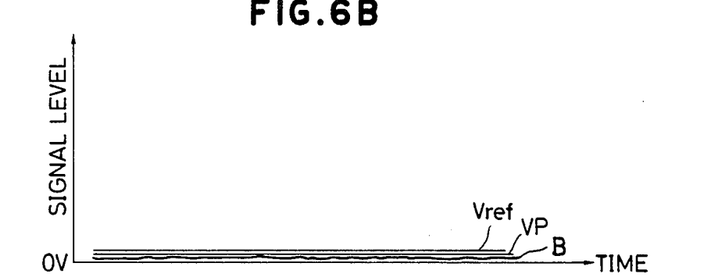
Figure 6C:
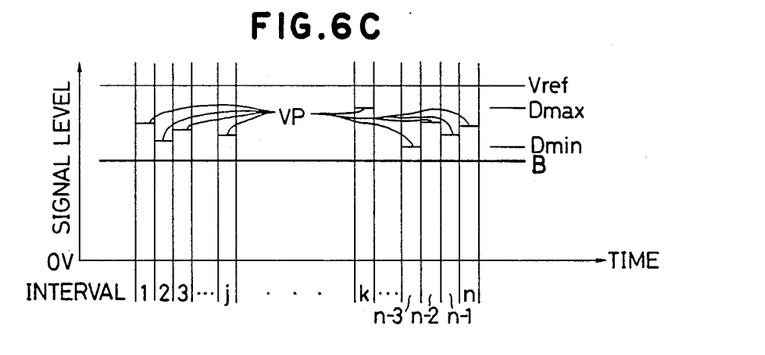

If the determination at step 10 is positive, then control is transferred to step 11, where a level amounting to 65 to 75% the white levels VP are called from memory 8a and set as threshold levels D, after which the actual image reading is off or performed. When lamp 1 is not lit, image signal B, white level VP, and reference voltage Vref converge in the vicinity of OV, as shown in FIG. 6B. Then, as shown in FIG. 6C which is an enlargement of FIG. 6B along the length of signal level, the difference Dmax−Dmin becomes very small. Consequently, the condition Dmax−Dmin>DEF results and the determination by step 10 becomes negative. Then control is transferred to step 12, where the reading process is cancelled, and the fact that the light source is off or not lit is indicated by means of an indicator lamp, not shown, or by other means.

As previously described, the embodiments of FIG. 5 has a configuration where each line of the image read is split into n intervals, for each interval the white level of an image signal is detected, threshold level D is set according to the detected white level, and at the same time the difference between the maximum and minimum values of the detected white levels is determined, to find whether the light source is lit or not lit. Consequently, as long as light enters even only one interval of the line sensor, the system can determine that the light source is lit.

Also, the system has a circuit configuration where output signals from the peak-hold circuit 11 are input into the D/A converter 10 as reference voltages, so that even if there is a variation in the light intensity from the light source 1 due to aging changes or a change in ambient temperature, the images of the source document P can be read with good fidelity.

It should be noted that although this embodiment is described as an improvement over the conventional system shown in FIG. 1 which does not have a shading plate, the description of this embodiment should not be construed as a limitation of this invention. Accordingly, this invention is also applicable to systems provided with a shading plate.

As explained above, since under this invention the device splits each line into n intervals, sets a white level for each interval, and determines whether or not the light source is lit on the basis of the difference between the maximum and minimum values of the white levels detected in the n intervals for a line, the device can determine that the light source is lit, as long as light enters the reading means even in a single interval. Thus, the device does not mistake the condition of "not lit" for "lit", and is capable of accurately determining the condition of "not lit".

Also, since the output signals from the peak-hold circuit are input into the D/A converter as reference electric potentials, even if there is variation in the light intensity from the light source due to the aging changes or a change in ambient temperature, high-fidelity reading of the images from the source document is possible.

Figure 8:
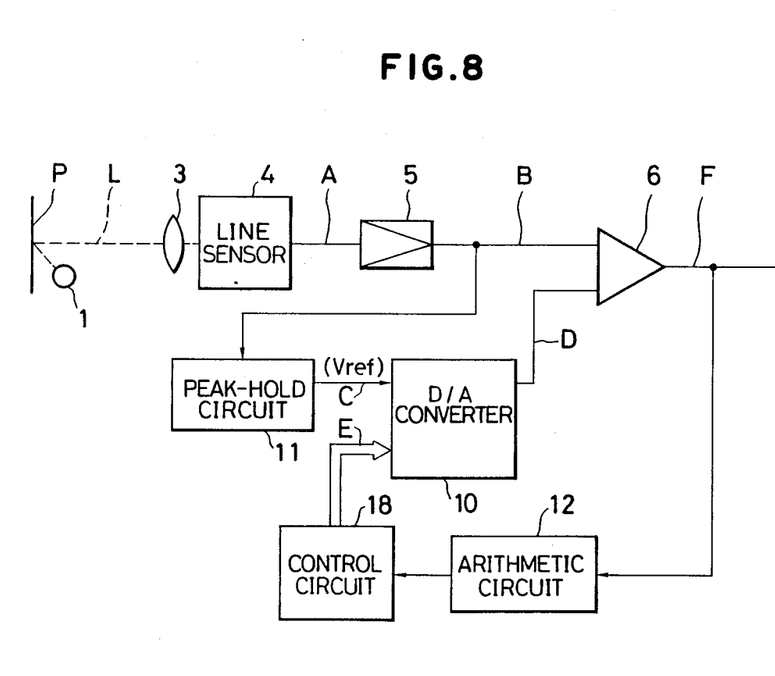
FIG. 8 is a block diagram showing another embodiment of the invention.

FIG. 8 shows another embodiment of the invention.

In this embodiment, a control circuit 18 is provided in place of the control circuit 8 of FIG. 5.

The control circuit 18 has the same functions as the control circuit 8 with regard to determination of the white levels for respective intervals and for providing the threshold levels during an actual image reading.

The control circuit 18 differs from the control circuit 8 in the manner of light source "off" detection. Specifically, the control circuit 18 performs the light source "off" detection on the basis of the relative magnitudes between white levels for the intervals which are adjacent to each other and located in a predefined region. For instance, where the pattern of the levels of an image signal is generally high at the center and is decreased toward the edges, the control circuit 18 applies all or predetermined ones of the following conditions:

(1): (white level for interval 2) $\leq$ (white level for interval 3) $\leq$ ... $\leq$ (white level for interval J)

(2): (white level for interval 5) $\geq$ ... $\geq$ (white level for interval n−2) $\geq$ (white level for interval n−1)

(3): The white level for interval 1 is below a predefined value.

(4): The white level for interval n is below a predefined value.

In the above conditions, intervals 2 through J lie on the left of the central interval of maximum light intensity, intervals K through n−1 lie on the right of it, and intervals 1 and n are the intervals with no light input.

The term "predefined value" in conditions (3) and (4) are so set as to be exceeded if any significant amount of light is input durning that interval.

Control circuit 18 determines that the light source is "lit" if the applied conditions are all true, and "not lit" or off if any of the conditions is false.

Figure 9A:
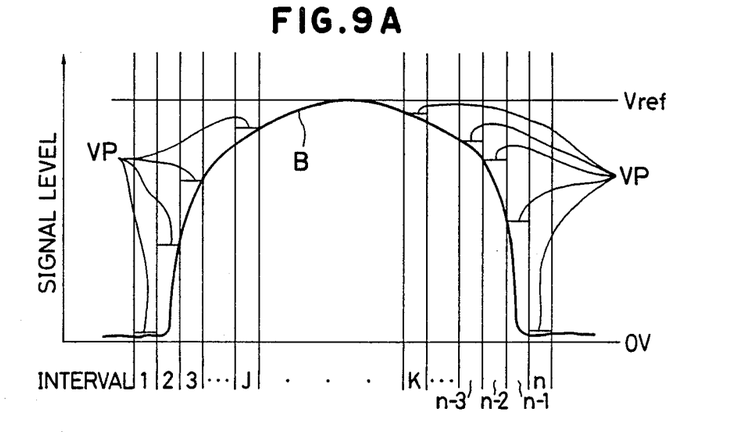
FIGS. 9A, 9B and 9C are graphs showing the relationship between reference potentials, an image signal and threshold levels.

FIG. 9A shows the white levels VP obtained by the above series of operations when the light source is lit; image signal B; and reference voltage Vref of D/A converter 16, output from peak-hold circuit 11.

Intervals 2 through n−1 receive light when the light source remains lit; intervals 1 and n receive no light. The white level detected for the intervals 1 and n are about the same as the dark output level of image signal B.

Based on the white level of image signal B determined for each interval, control circuit 18 sets threshold level D, which is analogous to white level VP of image signal B by reference to a correspondence table similar to that in memory 8a of FIG. 5, and starts an actual reading.

Because no shading plate is employed in the follow-up-type binarization circuit described, the output signals from the image signal B, obtained with the light source lit, reflect characteristics of the light source and lens, forming a pattern in which light intensity is high at the center and decreases toward the edges. An example of this effect is illustrated as the image signal B in FIG. 9A.

When the follow-up-type binarization circuit is operated on an image signal B with the light source lit, the white levels VP representing the m−th highest pixel signals in respective intervals show a pattern which is high at the center and decreasing toward the right and the left. FIG. 9A shows an example of the white levels VP.

By contrast, the white levels VP of image signal B obtained with the light source not lit represent dark output levels having a very low voltage and form a generally flat pattern with the effects of noise. When the flat image signal B is input into peak-hold circuit 11, this circuit outputs a voltage approximately equal to the white levels VP of image signal B; this output, then, is input as reference voltage Vref of D/A converter 10.

Control circuit 18 searches for the white levels VP of image signal B between the reference voltage Vref and zero volts, and sets threshold levels D or VP.

Figure 9B:
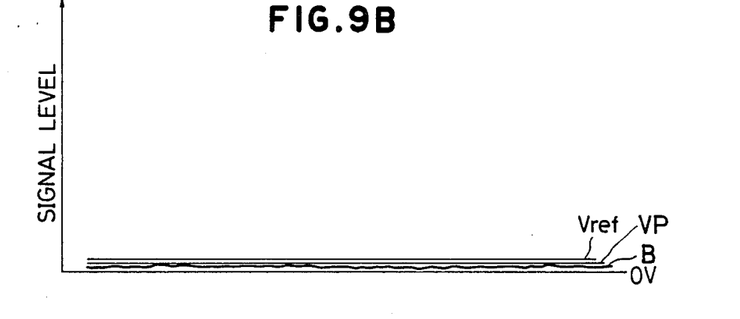
Figure 9C:
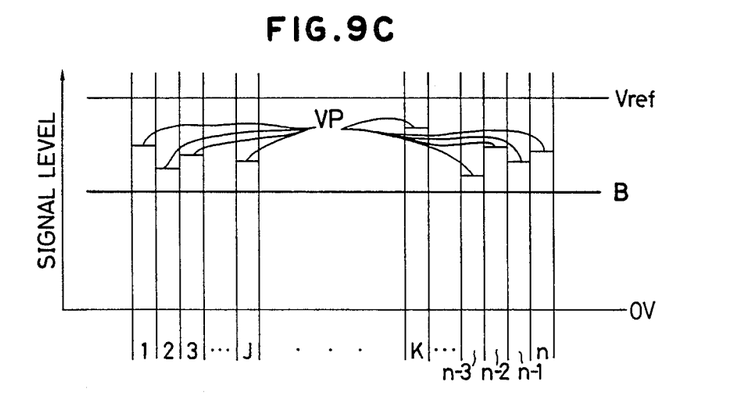

FIG. 9B shows reference voltage Vref, image signal B, and white levels VP reflecting the condition of the light source which is not lit or off. FIG. 9C is an enlargement of the voltage between reference voltage Vref and zero volts.

Although in FIG. 9C, image signal B is shown as a straight line, in actuality it fluctuates up and down due to noise and other effects. Peak-hold circuit 11 holds the maximum value of the image signal B as it fluctuates up and down.

The follow-up-type binarization circuit detects the white levels VP of image signal B for the respective intervals. As shown in FIG. 9C, white levels thus detected undergo random variations from one interval to another due to effects of random noise.

As stated earlier, when the light source is lit, white levels VP for the intervals at the center are high and are decreased toward the edges, as illustrated in FIG. 9A. When the light source is not lit, white levels VP have random magnitudes with no interrelationship between intervals, as shown in FIG. 9B and FIG. 9C. Thus, the condition of the light source which is lit and that of the light source which is not lit or "off" differ significantly in terms of the patterns of detected white levels VP.

With the light source lit, the detected white levels of the intervals not receiving light are the dark output levels shown for intervals 1 and n in FIG. 9A. Such dark output levels are considerably lower than the reference voltage Vref output from the peak-hold circuit, i.e., the detectable maximum level. When the light source is not lit, reference voltage Vref output from the peak-hold circuit with the light source off is about the same as image signal B which has become a dark output level, so that the level for intervals 1 and n may not be detected as a low level.

Since reference voltage Vref of D/A converter 10 depends on the peak level of image signal B, even if the absolute level of image signal B is the same, if Vref is high, the absolute level is treated as a low level; if Vref is low, it is treated as a high level. Thus, image signal B is always detected on a relative basis.

For each image signal B obtained after the start of a reading but before the start of an actual data reading, an control circuit 18 detects a white level for each interval. It reduces the white levels with a certain ratio from the detected white levels to determine threshold levels D analogous to white levels VP. When it finishes detecting the white levels of image signal B for the respective intervals, control circuit 18 uses the following conditions:

(1): (white level for interval 2) < (white level for interval 3) < ... < (white level for interval J)

(2): (white level for interval K) < ... < (white level for interval n−2) < (white level for interval n−1)

(3): The white level for interval 1 is below a predefined value.

(4): The white level for interval n is below a predefined value.

In the above conditions, intervals 2 through J lie to the left of the central interval of maximum light intensity, intervals K through n−1 lie to the right of it, and intervals 1 and n are intervals receiving no light input.

The predefined values in the conditions (3) and (4) are chosen to be exceeded when any significant amount of light enters these intervals.

Control circuit 18 applies either all of the above conditions or previously specified ones of the above conditions to the white levels detected for the intervals; it determines that the light source is "lit" if the applied conditions are all true, and "not lit" if any one of the conditions is false.

In the above embodiment, the comparison of the levels between intervals was made in terms of a strict inequality. However, for the intervals in the vicinity of the center of an image signal or in situations where, due to the particular characteristic of the light source, there is not much difference in light intensity between the center and the edges, the conditions "greater than or equal" or "less than or equal" can be substituted.

Figure 10:
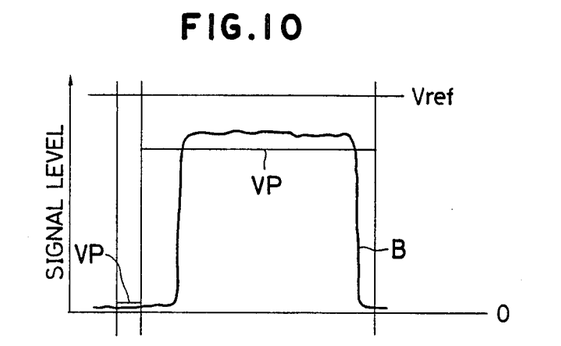
FIG. 10 is a graph showing a potential reference and an image signal in a further embodiment of the invention.

Further, although in the above embodiment a line is divided into several intervals, as shown in FIG. 10, an interval can be set up for the region of no light. Then, given a detected white level, a condition similar to condition (3) or (4) "with a detected white level less than or equal to a specified level" can be applied to obtain similar results. If the "specified level", with which the detected white level is compared is varied in proportion to the reference level Vref, (i.e., the peak level over the entire line) such variation on the basis of the conditions (3) and (4) is considered a form of judgement on the basis of the relative magnitude of the white levels between the intervals.

Figure 11A:
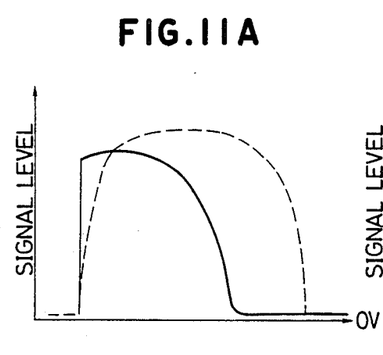
FIGS. 11A, 11B and 11C are graphs showing an image signal in a further embodiment.
Figure 11B:
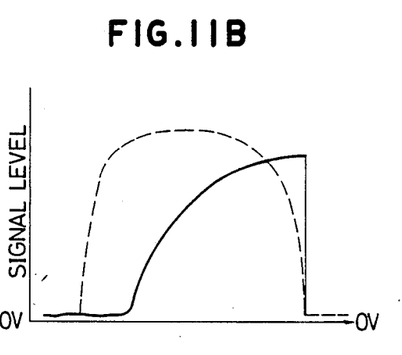
Figure 11C:
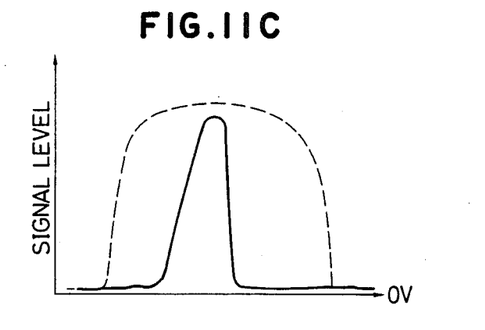

In the event that the light axis in the optical system gets physically distorted, and if the normal image signal shown with dotted lines in FIGS. 11A, 11B, and 11C take an abnormal wave pattern, as shown with the solid line, by applying either condition (1) or (2), or both, the device can detect that the signals are not normal image signals.

As an alternative to the previous embodiment employing follow-up-type binarization circuit, the reference voltage Vref of the D/A converter shown in FIG. 8 may be held constant. Yet, it can be detected that the light source is not lit, by applying the conditions (1) and (2).

The invention is featured in that the condition of the light source not lit is detected on the basis of the white levels of the image signal for the respective intervals. In the various embodiments described, the white levels are utilized directly for this purpose, i.e., without intervening processing. But the invention is not limited to such a situation but instead should be construed to cover such a situation where the white levels are converted into corresponding values, which are then utilized for the detection of a light source "off" condition. For instance the threshold levels for the respective intervals which are determined on the basis of the respective white levels may be used for the detection of the light source "off" condition.

The embodiment described eliminates the need for incorporating into the device photosensors and other dedicated components for detecting the light source "off" condition, and makes it possible to detect the light source "off" condition through the use of a binarization circuit.

Also, by entering output signals from the peak-hold circuit as a reference voltage for the D/A converter, the device is capable of detecting the light source "off" condition unaffected by changes in light intensity from the light source due to the aging changes or a temperature variation.

What is claimed is:

1. An image reading device comprising
    a light source for illuminating a medium to be read,
    a line sensor including a line of photoelectric conversion elements for receiving light from the medium and producing an image signal,
    means for determining white levels for respective intervals into which said line of photoelectric conversion elements are divided,
    means for setting threshold levels for the respective intervals on the basis of said white levels for the respective intervals,
    means for comparing the image signal with said threshold levels to produce a series of binary signals, and
    means for detecting the off condition of said light source on the basis of the relative magnitudes between said white levels for said respective intervals.

2. An image reading device according to claim 1, wherein said means for detecting the off condition of said light source comprises means for performing said detection on the basis of the difference between the maximum and minimum values of said white levels set for the intervals.

3. An image reading device according to claim 1, wherein said means for detecting the off condition of light source comprises means for performing said detection on the basis of the white levels for the intervals that are adjacent each other and located in a predefined region.

* * * * *